United States Patent [19]

Nishi et al.

[11] Patent Number: 4,578,960
[45] Date of Patent: Apr. 1, 1986

[54] AUTOMOTIVE REFRIGERATION

[75] Inventors: Yasuyuki Nishi, Obu; Masasi Takagi, Kariya; Masao Sakurai, Obu, all of Japan

[73] Assignee: Nippondenso Co., Ltd., Kariya, Japan

[21] Appl. No.: 674,368

[22] Filed: Nov. 26, 1984

Related U.S. Application Data

[63] Continuation of Ser. No. 441,861, Nov. 15, 1982, abandoned.

[30] Foreign Application Priority Data

Nov. 16, 1981 [JP] Japan .............................. 56-183498

[51] Int. Cl.$^4$ ............................................. F25B 41/00
[52] U.S. Cl. ..................................... 62/196.3; 62/217; 62/227; 236/80 R
[58] Field of Search ............... 417/440; 236/80 R, 84, 236/DIG. 6; 62/196.2, 217, 227

[56] References Cited

U.S. PATENT DOCUMENTS

| | | | |
|---|---|---|---|
| 1,780,442 | 11/1930 | Schmieding | 62/217 |
| 2,019,724 | 11/1935 | Otto | 236/DIG. 6 X |
| 2,316,066 | 4/1943 | Haymond | 62/217 |
| 2,328,824 | 9/1943 | McCormack et al. | 417/440 X |
| 2,577,902 | 12/1951 | McGrath | 236/DIG. 6 X |
| 2,983,111 | 5/1961 | Miner et al. | 62/115 |
| 3,803,863 | 4/1974 | Jednacz et al. | 62/227 X |
| 3,818,717 | 6/1974 | Peruglia | 62/217 |
| 3,977,207 | 8/1976 | Scherer et al. | 62/217 |
| 4,342,199 | 8/1982 | Shaw et al. | 62/196.3 X |

FOREIGN PATENT DOCUMENTS

569694 3/1929 Fed. Rep. of Germany.

Primary Examiner—William E. Wayner
Attorney, Agent, or Firm—Cushman, Darby & Cushman

[57] ABSTRACT

A refrigeration system for use in an automotive air conditioning system has a vane type variable displacement refrigerant compressor drivingly connectable by an electromagnetic clutch to an automotive engine, a refrigerant evaporator through which air is caused to flow by a blower, and a pressure check valve which prevents the refrigerant pressure in the evaporator from lowering under the predetermined pressure, so that frost or icing is not formed on the evaporator fins. The compressor is provided with one or two unloading ports for releasing the refrigerant being compressed and with a valve member or members associated with the unloading port. The refrigerator temperature and the pressure of the refrigerant in the conduit between a throttling valve and the compressor are detected. A signal is emitted to an electric circuit for actuating the valve member or members so that the unloading port is selectively opened to vary the compressor displacement to provide a multi-stage compressor displacement control.

11 Claims, 10 Drawing Figures

AUTOMOTIVE REFRIGERATION

This is a continuation of application Ser. No. 441,861, filed Nov. 15, 1982, now abandoned.

BACKGROUND OF THE INVENTION

The present invention relates to a refrigeration system for use in an automotive air conditioning system which saves power and increases cooling capacity.

DESCRIPTION OF THE PRIOR ART

A typical conventional automotive air conditioning system employs a vapor compression type refrigeration cycle consisting essentially of a compressor, a condenser, a receiver, an expansion valve and an evaporator. Since the compressor is driven by the automobile engine through an electromagnetic clutch, the operation speed of the compressor is naturally increased as the engine speed increases. In this conventional air conditioning system, a frosting or icing often takes place on the fins of the evaporator as the surface temperature of the evaporator fins, namely, the evaporation temperature of the refrigerant, falls considerably below 0° C. due to either the increase in the operation speed of the compressor or the reduction of the cooling load. The frosting or icing on the fins reduces the rate of the air flow from a blower through the evaporator, resulting in a reduction in the air cooling capacity.

In order to prevent the frosting or icing on evaporator fins or to control the air temperature in the automobile, a pressure check valve is installed between the evaporator and compressor to prevent the evaporation temperature from falling considerably below 0° C.

This arrangement, however, has the following drawbacks.

During the operation of the compressor, the displacement of the compressor is in the maximum capacity out of relation to any cooling load. In consquence, the maximum load torque is imparted to the engine so that power is consumed wastefully and much noise is made.

When the compressor is stopped to avoid the wasteful operation of the compressor, the air temperature just downstream of the evaporator is varied widely due to the discontinuous operation of the compressor to give an unpleasant feeling of cooling to the users.

SUMMARY OF THE INVENTION

It is a primary object of the present invention to provide an improved refrigeration system which is entirely free from the above-discussed problems.

It is another object of the present invention to provide an air conditioning system in which the displacement of a compressor is varied by the cooling load.

The automotive refrigeration system according to the present invention essentially comprises a variable capacity refrigerant compressor adapted to be drivingly connected and disconnected to and from an automotive engine by means of an electromagnetic clutch. The compressor includes means for varying the displacement of the compressor and is disposed in fluid-flow communication with a refrigerant evaporator of a refrigeration cycle. The refrigeration system also includes a pressure check (throttling) valve to prevent the refrigerant pressure in the evaporator to fill considerably below 0° C.

A condition related to the operation of the throttling valve is detected by a senser located on the surface of a conduit downstream of the throttling valve which emits a signal. The refrigeration system further includes electric circuit means operative in response to the signal from the senser means to actuate means for controlling the compressor displacement varying means so that the displacement of the compressor is varied in accordance with the senser signal. The electric circuit means further operates to control the operation of the electromagnetic clutch.

The compressor may be of a vane type. The compressor displacement varying means may comprise at least one unloading port formed in the compressor and being adapted to release the refrigerant being compressed and a valve member operatively associated with the unloading port. The controlling means may comprises a pressure responsive actuator operatively connected to the valve member and a solenoid valve means adapted to be actuated by electric circuit means to control the application of a pressure to the pressure responsive actuator. When the unloading port is opened by the valve member, the compression of the refrigerant in a working space in the compressor is not started until after the working space is moved out of communication with the unloading port. Thus, the displacement of the compressor is reduced from the maximum compressor displacement which is obtained when the unloading port or ports are all closed by the associated valve member or members. The valve member or members are opened and closed in accordance with the signal emitted by the sensor means to the electric circuit means so that the compressor displacement can be varied stepwise to provide a multi-stage displacement control. In the case where a single unloading port is employed, the system provides two stages of compressor displacement control, whereas the system can provide three stages of compressor displacement control in the case where two unloading ports are utilized. This multi-stage compressor displacement control is combined with the clutch engagement and disengagement control to provide an increased number of stages of compressor displacement control.

The senser means may detect temperature of the surface of the refrigerant conduit between the throttling valve and the compressor.

The pressure check valve for controlling refrigerant pressure in the evaporator prevents the temperature of the evaporator from lowering considerably below 0° C. so that frost is not formed on the evaporator fins. It is not necessary to stop the compressor, and the air temperature just downstream of the evaporator is not cooled too much and kept comparatively constant.

The above and other objects, features and advantages of the present invention will be made apparent by the following description with reference to FIGS. 1 through 9 of the accompanying drawings.

BRIEF DESCRIPTION OF THE DRAWINGS

FIGS. 4(a) and 4(b) are diagrammatic crosssectional view of the compressor cylinder and rotor showing the rotor in different positions to illustrate the compressor displacement changes;

DESCRIPTION OF THE PREFERRED EMBODIMENTS

Figure 1:
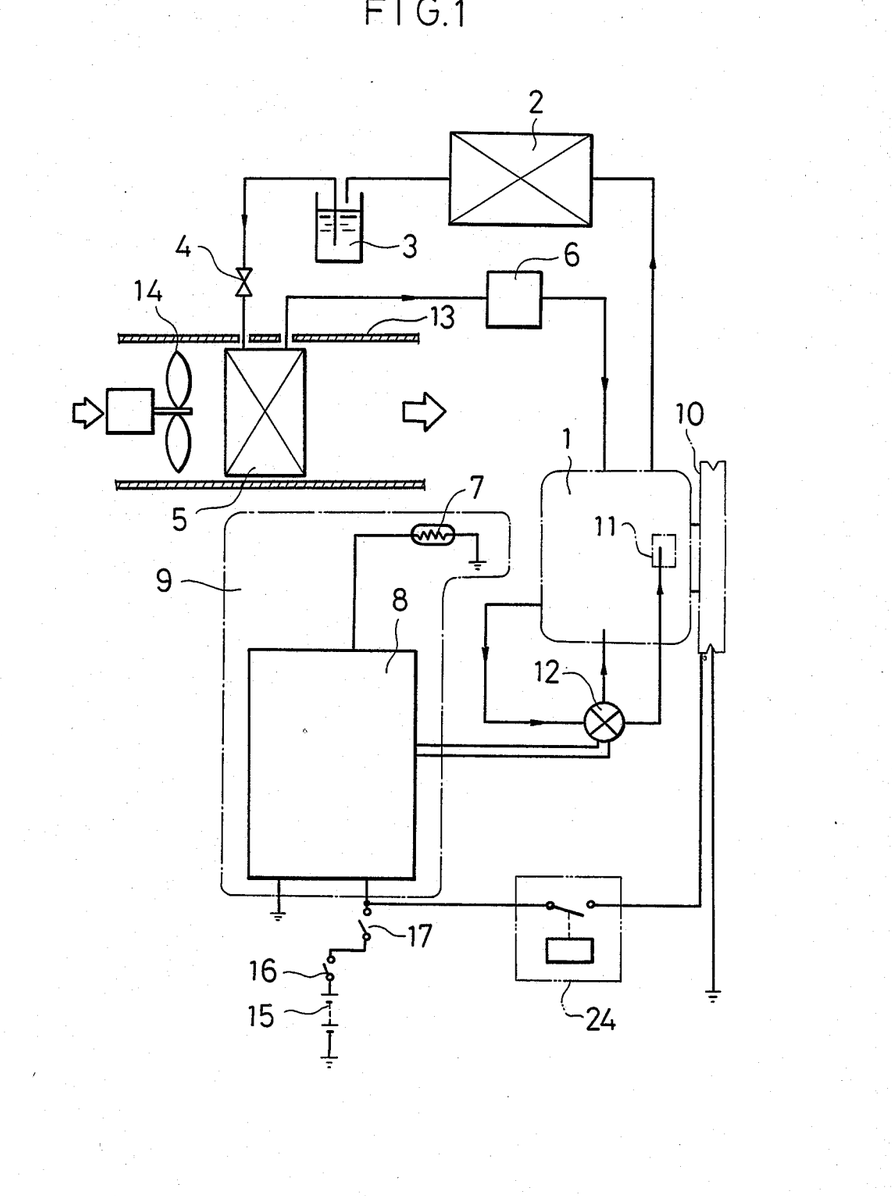
FIG. 1 is a diagrammatic illustration of an embodiment of the refrigeration system according to the present invention.

The refrigeration system embodying the present invention is shown in FIG. 1. The refrigeration system consisting essentially of a compressor 1, a condenser 2, a receiver 3, an expansion valve 4, an evaporator 5, a pressure check valve 6, a sensor 7 detecting the temperature related the cooling load of the compressor 1 and a controlling circuit 8 receiving the signal of the senser 7.

The compressor 1 is adopted to be driven by the automobile engine (not shown) through an electromagnetic clutch 10. As will be described later, this compressor 1 is of variable capacity or variable discharge type including displacement varying means 11. The senser 7 consisting of a thermistor is adopted to detect the ambient air temperature. The output signal of the senser 7 is delivered to a controlling circuit 8 adopted to control solenoid-operated pilot valve 12 for actuating or controlling the compressor displacement varying means 11. The condenser 2 may be usually placed in front of the radiator of an automobile. The refrigerant gas out of compressor 1, which is of high temperature and pressure, is cooled here by the blow from the cooling fan of the engine and air-flowing on the running of the automobile. Thus the gas is changed to liquid-refrigerant. The receiver 3 is to store this liquid-refrigerant for supplying to the evaporator 5 in response to the cooling load. The expansion valve 4 acts to depress the pressure by expanding the liquid-refrigerant sprayed out of a small hole to become the vapor-refrigerant. The evaporator 5 is composed of a coiled pipe through which the vapor-refrigerant flows, and evaporator fins welded to the pipe. The air blown by the motor-driven blower 14 is cooled by the evaporator 5. The evaporator 5 and the blower are disposed in a plastic duct 13. The duct is communicated at its left-hand end with an ambient air intake opening and an internal air intake opening through a communication-switching box which is not shown. The duct is also communicated at its right-hand end with air outlets open to the passenger compartment, such as upper air outlets for cooled air and lower air outlets for warmed air. A heater unit, not shown, is disposed in the duct 13.

The pressure check valve 6 for controlling the pressure in the evaporator 5 is placed between the evaporator 5 and the compressor 1, which is composed of a valve, spring, and diaphram. When the cooling load is lowered and the pressure in the evaporator 5 is low, the spring resiliently biases the diaphram because of the higher pressure of the refrigerant so that the valve is closed. The pressure valve of the present embodiment uses the spring adjusting its compressive pressure equal to the evaporating pressure of the refrigerant at 0° C. (about 2.1 kg/cm² G R-12 is used for refrigerant), so that the valve prevents the temperature of the refrigerant from falling below 0° C. Also, the valve prevents the frosting or icing on the evaporator fins.

A relay 24 is provided to control the electrical supply to the electromagnetic clutch 10 to thereby connect and disconnect the compressor 1 to and from an automotive engine, not shown. The operation of the air conditioner can be manually controlled by an airconditioner switch 17 which is provided in series with an engine ignition switch 16 which in turn is provided in series with batteries 15 mounted on an associated automobile.

Figure 2:
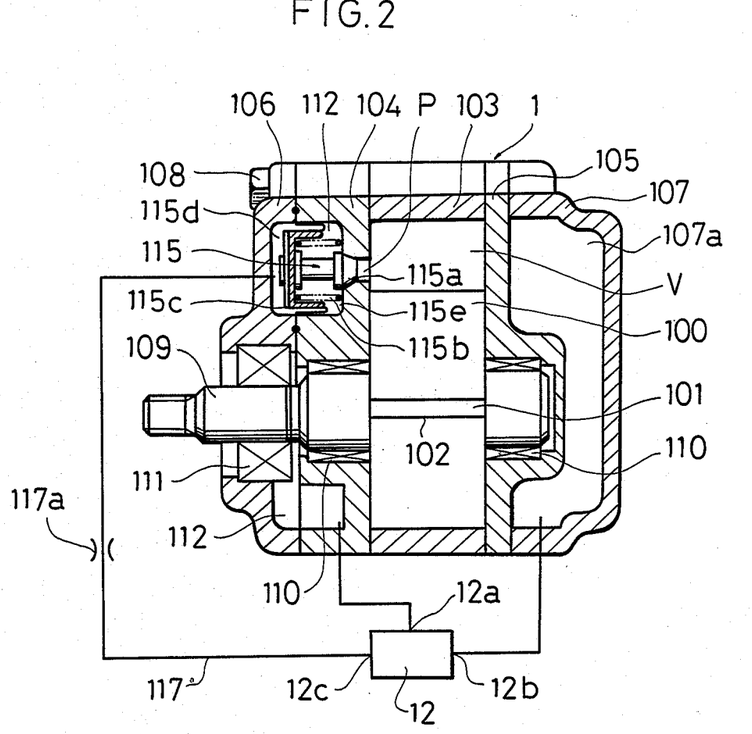
FIG. 2 is an axial sectional view of the compressor shown in FIG. 1.
Figure 3:
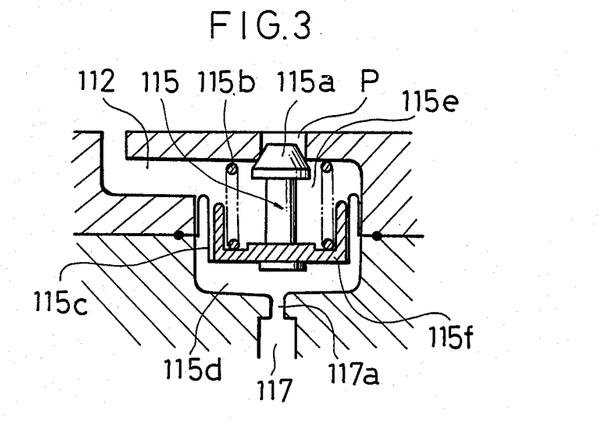
FIG. 3 is an enlarged fragmentary sectional view of the compressor showing the structural detail of an on-off valve shown in FIG. 2.
Figures 4, 5:
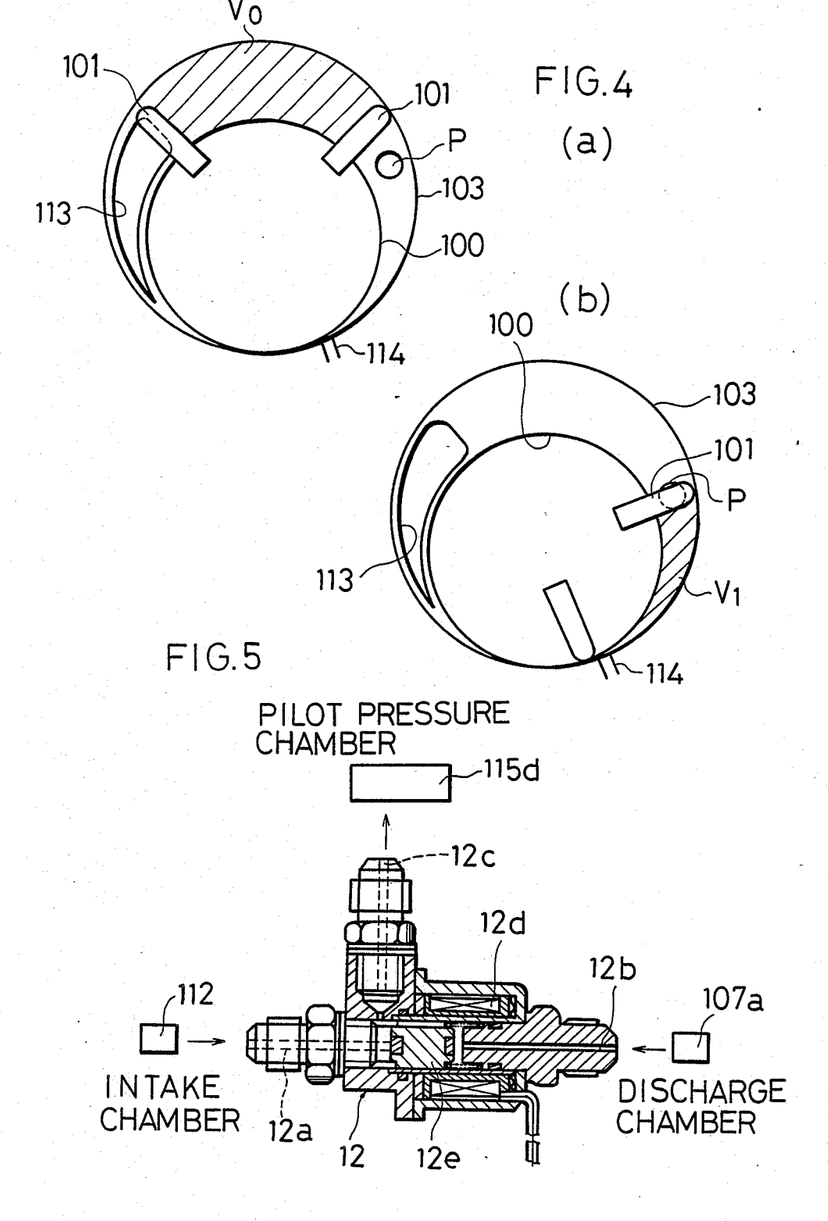
FIG. 5 is a partial sectional view of a solenoid valve used as a pilot for controlling the on-off valve shown in FIGS. 3 and 4.

Referring now to FIGS. 2–4 the compressor 1 includes a cylindrical rotor 100 carying a plurality of vanes 101 mounted for radial sliding movement in radial grooves 102 formed in the outer peripheral surface of the rotor. Two vanes 101 only are shown in FIGS. 4(a)–4(b) but it can be appreciated by those in the art that in fact the rotor 100 caries four vanes arranged at equal angular intervals. The rotor 100 is disposed eccentrically in a cylinder 103 having an inner peripheral surface which limits the radial outer movements of respective vanes 101 and with which the vanes are in slidable contact at their outer ends. Front and rear end plates 104 and 105 are secured to the opposite ends of the cylinder 103. The rotor 100 and the vanes 101 are axially dimensioned such that their opposite axial ends are spaced from the end plates 104 and 105 so that very small gaps are defined therebetween.

The rotor 100, vanes 101, cylinder 103 and front and rear end plates 104 and 105 cooperate together to define variable working spaces V the volume of which are varied as the rotor 100 is rotated with the vanes 101. The cylinder 103, front and rear end plates 104 and 105 and a pair of housing members 106 and 107 are secured together by bolts 108 to form a unitary structure. The rotor 100 is rigidly mounted on a shaft 109 which in turn is rotatably mounted on the front and rear end plates 104 and 105 by means of bearings 110 and adapted to be driven by the engine through torque transmission means including the electromagnetic clutch 10 referred to above. A seal 111 is provided between the shaft 109 and the housing member 106.

The front end plate 104 and the housing member 106 cooperate to define therebetween an intake chamber 112 connected to the evaporator 5 to receive the refrigerant therefrom. The front end plate 104 defined therein an intake port 113 (see FIGS. 4(a)–4(b)) through which the intake chamber 112 is adapted to be communicated with successive working spaces V so that the refrigerant is sucked from the intake chamber 112 into successive working spaces V. FIG. 4(a) illustrates one working space Vo as being charged with the refrigerant at an intake pressure. The refrigerant in the working space V is gradually compressed as the volume of the working space Vois decreased. When the working space V1 is brought to a maximum compression position, the compressed refrigerant is discharged from the working space V1 through a discharge port 114 in the cylinder 103 and through a discharge valve (not shown) into a discharge chamber 107a defined between the housing member 107 and the rear end plate 105. The discharged refrigerant is then recirculated from the discharge chamber 107a to the condenser 2 of the refrigeration cycle.

The front end plate 104 is formed therein with an unloading port P disposed at angularly spaced points to communicate the intake chamber 112 with working space V. A on-off valve 115 is provided to close and open the unloading port P.

When the unloading port P is opened by the valve 115, the working space V which is communicated with the unloading port P is not capable of performing its compression operation until after this working space is moved out of communication with the port P. Thus, this working space commences its compression operation from a volume V1, as shown in FIG. 4(b). It will be seen from the comparison between FIGS. 4(a) and 4(b) that the initial or compression-starting volume V1 in the case of the unloading port P being opened by the valve 115 is much smaller than the initial or compression-starting volume Vo in the case of the port P being closed by the valve 115. In the illustrated embodiment of the invention, the unloading port P is positioned such that the volume V1 is approximately 30-50% of the volume Vo.

Referring to FIG. 3, the valve 115 has a valve member 115a movable into and out of sealing engagement with peripheral edges of the unloading port P, a spring 115b resiliently biasing this valve member 115a in valve-opening direction, a bellow -phragm 115c adapted to actuate the valve member 115a to the valve-closed position and a cup-shaped member 115f acting as a spring retainer and guide for the bellow-phragm. The valve member 115a is made of a material having a high mechanical strength, such as a stainless steel. The outer surfaces of the cup-shaped member 115f and the bellow-phragm 115c cooperate with the housing member 106 of the compressor to define a pilot pressure chamber 115d which is connected by a pilot pressure passage 117 to the solenoid-operated pilot valve 12 to be described later. The passage 117 is provided therein with a restriction 117a which is operative to prevent the pilot pressure chamber 115d from being subjected to sudden increase in the pilot pressure applied thereto. The inner surfaces of the cup-shaped member 115f and the bellow-phragm 115c cooperate with the front end plate 104 to define chamber 115e which is communicated with the intake chamber 112 of the compressor 1.

The unloading port P and the valve 115 cooperate to constitute the compressor displacement varying means 11.

The pilot valve 12 is operative to control the actuator for the valve 115 associated with the unloading port P.

The structural details of the pilot valve 12 is shown in FIG. 5. This valve 12 includes compressor intake pressure inlet port 12a pneumatically connected to the compressor intake chamber 112, compressor discharge pressure inlet port 12b pneumatically connected to the compressor discharge chamber 107a and pilot pressure outlet port 12c pneumatically connected to the pilot pressure chamber 115d in the compressor, as shown in FIG. 2. The pneumatic connections between the pilot valve 12 to the compressor 1 are shown in FIG. 2. The pilot valve 12 further includes a coil 12d adapted to be elctrically energized and deenergized to electromagnetically actuate valvemember 12e of a magnetic material so that the positions of the valve member 12e with respect to the pressure inlet ports 12a and 12b are selectively changed to communicate the pilot pressure outlet port 12c either with the compressor intake chamber 112 through the pressure inlet port 12a or with the compressor discharge chamber 107a through the pressure inlet port 12b.

When the pressure outlet port 12c is communicated with the compressor intake chamber 112, the pilot pressure chamber 115d is at the compressor intake pressure, so the spring 115b moves the valve member 115a away from the unloading port P to allow working space V to be communicated with the compressor intake chamber 112. On the other hand, when the pilot pressure outlet port 12c of the pilot valve is communicated with the pressure discharge chamber 107a, the compressor discharge pressure is introduced into the pilot pressure chamber 115d so that the valve member 115a is moved against the spring 115b into sealing engagement with the pripheral edges of the unloading port P to interrupt communication between the compressor intake chamber 112 and the working space V.

In order to prevent the solenoid-operated pilot valve 12 from being overheated, it is disposed at or adjacent the point of the compressor 1 which are kept at relatively low temperature levels, such as a service valve (not shown) or the front housing member 106.

Figure 6:
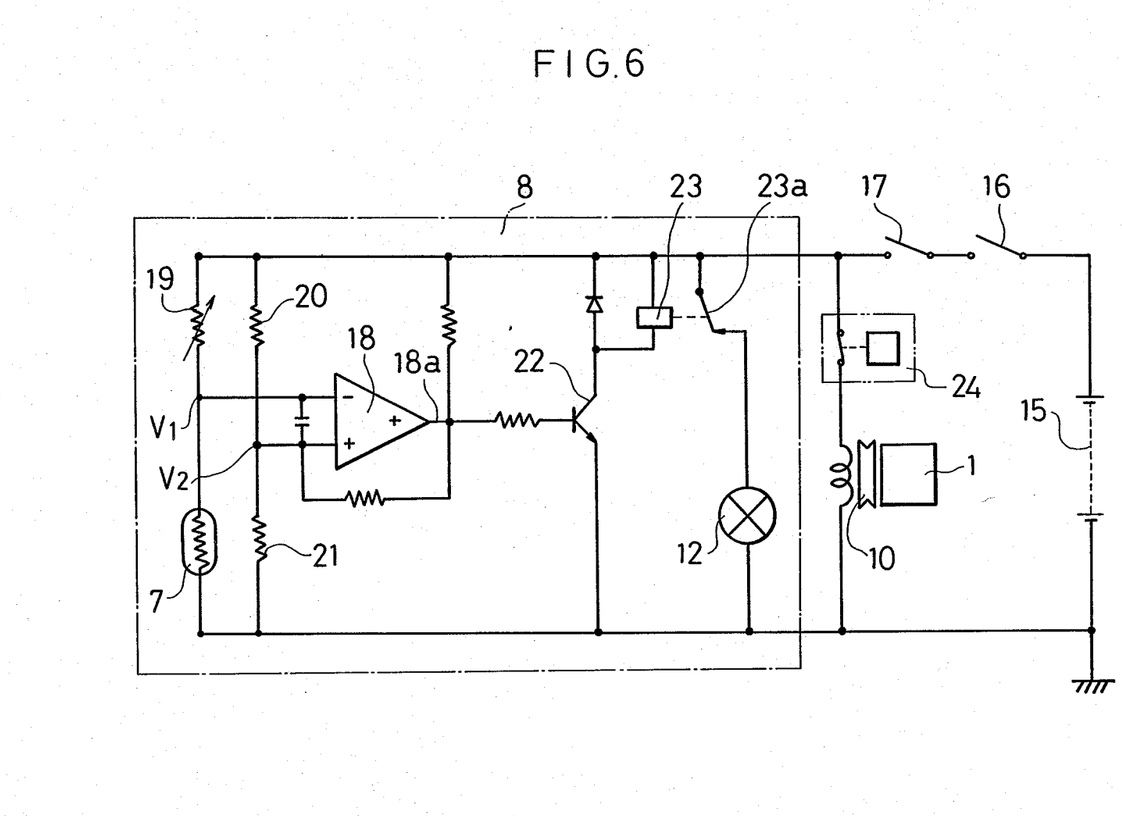
FIG. 6 shows an electric circuitry of the controlling circuit of the system shown in FIG. 1.

Referring now to FIG. 6, a practical example of the controlling circuit 8 includes comparator 18 operative to produce electrical output 18a which is determined by an electric potential V1 dependant on a resistance R7 of the thermistor of the senser 7, and the resistance of a resistor 19, and a reference potential V2 dependent on resistor 20 and 21. Variation in the thermistor resistance R7 causes the comparator output 18a to be varied in a manner shown in FIG. 7.

Figure 7:
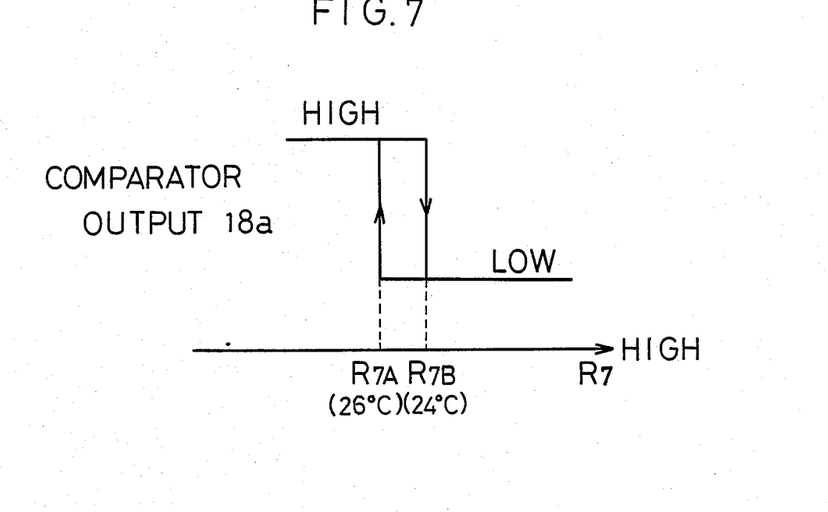
FIG. 7 illustrates the operation characteristics of the comparator of the electric circuitry shown in FIG. 6.
Figure 8:
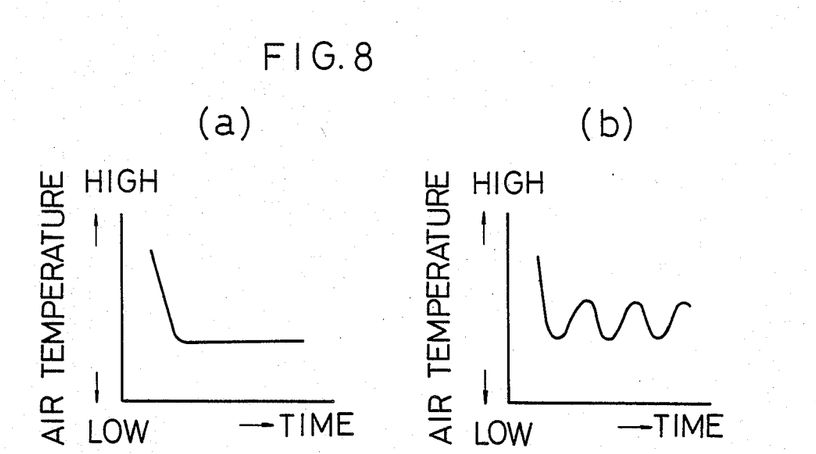
FIG. 8(a) graphically illustrates variations in the air just downstream of the evaporator according to the present invention.
FIG. 8(b) is a similar view to FIG. 8(a) but illustrates the air of the prior art evaporator.

When the surrounding air temperature is relatively high, for example higher than 26° C., the thermistor resistance R7 is at a level smaller or lower than R7A. At this time, the comparator output 18a is at its "High"-'level, so that the point 23a of the rely 23 is opened. Thus, the solenoid valve 12 is not energized, and the compressor is operated at its maximum (100%) displacement. When the surrounding air temperature is lowered, for example lower than 24° C., the thermistor resistance R7 is increased to the level R7B so that the comparator output 18a will become "Low" level to switch the relay 23 on. Thus, the solenoid valve 12 is energized and opened to cause the compressor 1 to be operated at a lowerwitch the relay 23 on. Thus, the solenoid valve 12 is energized and opened to cause the compressor 1 to be operated at a lowered displacement level.

The operation of the system described above will be discussed hereunder. When the ambient air temperature is at a high level (higher than 26° C.) and the resistance R7 of the thermistor of the senser 7 is less than the level R7a, the electrical supplies to the solenoid valve 12 is interrupted to cause the valve member 12e to block the compressor intake pressure inlet port 12a so that the compressor discharge pressure is fed through the pressure inlet port 12b and the pilot pressure outlet port 12c into the pilot pressure chamber 115d. Thus, the unloading port P is closed by the valve 115a to cause the compressor 1 to be operated at its maximum capacity or displacement.

The refrigerant is charged in the working space V through the intake port 113, and compressed. The compressed and heated refrigerant is discharged from the working space V through discharge port 114 into a discharge chamber 107a. Then the discharged refrigerant is recirculated to the condenser 2. In the condenser 2, the compressed and heated gaseous refeigerant becomes liquid refrigerant by the cooling. The liquid refrigerant is stored temporarily in the receiver 3. Then, the liquid is injected into the evaporator 5 through a small hole of the expansion valve 4.

The liquid is suddenly expanded and becomes cold vapor refrigerant under a low pressure. This cold refrigerant refrigerates the evaporator fins, which cool the air brought by the blower 14 and the cooled air refrigerates the room of the automobile. The gaseous refrigerant is sent to the compressor 1 through pressure check valve 6, which keeps the refrigerant pressure higher than a predetermined pressure so that the refrigerant is prevented to be cooled below 0° C. When the refrigerant pressure becomes lower than the predetermined pressure, a spring closes the valve 6 and turn off the refrigerant from the evaporator 5 to compressor 1. This prevents to cool the refrigerant further in the evaporator, and to form frost or ice on the fins. The compressor 1 is operated without receiving refrigerant gas. Gradually the evaporator 5 is heated by the air and the gaseous refrigerant pressure becomes higher, and opens the pressure check valve 6, again gaseous refrigerant is sent from the evaporator 5 to the compressor 1.

When the ambient air temperature is lowered and the thermistor resistance R7 is increased to a level R7B, the coil 12d of the pilot valve 12 is electrically energized to actuate the valve member 12e to a position in which the compressor intake pressure inlet port 12a is unblocked and communicated with the pilot pressure outlet port 12c. Thus, the compressor intake pressure is now applied to the pilot pressure chamber 115d to cause the valve member 115a of the valve 115 to be moved by the spring 115b to a valve-open position. Thus, the unloading port P is now opened to reduce the compressor displacement to a level equal to from 30% to 50% of the maximum displacement.

The refrigerant discharged under the reduced compressor displacement flows in the same way as under the maximum displacement.

Figure 9:
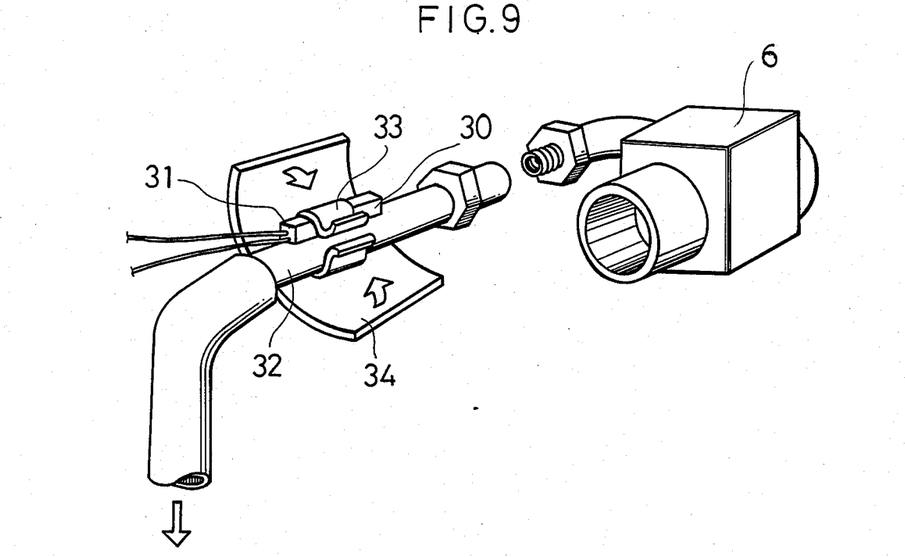
FIG. 9 is a perspective view of a part of refrigerant conduit disposed between the pressure check valve and the compressor, provided with a temperature senser.

The refrigeration system mentioned above employs a thermistor as the sensor 7. Instead of the thermistor, a temperature switch can be used. An example using temperature switch 30 is shown in FIG. 9. The temperature switch 30 is a kind of reed switches incased within an aluminum box 31 which is fixed on the surface of a conduit 32 between valve 6 by a clamp 33 and covered with a thermal insulator 34. The conduit 32 is made of aluminum and connects an evaporator 5 with a compressor.

Pressure check valve 6 is disposed in conduit 32. The switch 30 works to turn on at −1° C. and turn off at 3° C.

Figure 10:
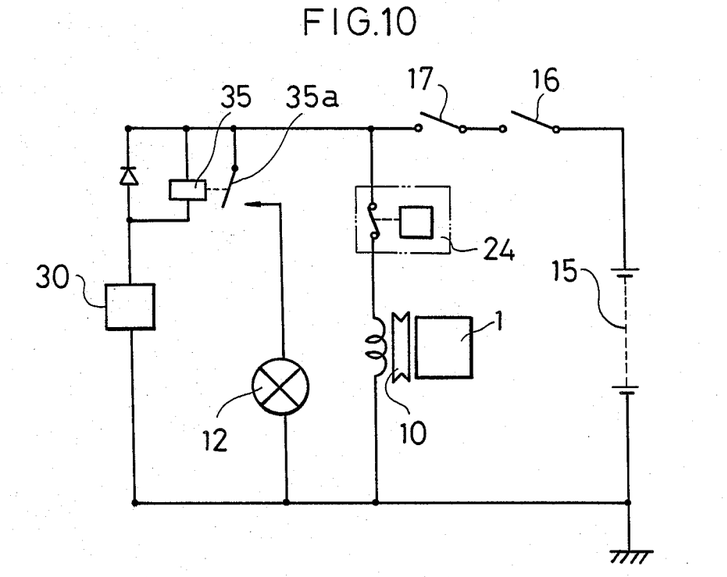
FIG. 10 shows an electric circuitry of the controlling circuit equipped with the senser shown in FIG. 9.

A controlling circuit employing the temperature switch 30 is shown in FIG. 10. This circuit is similar to that shown in FIG. 6. In this circuit, the temperature switch 30 shifts directly the relay 35. When the temperature of the conduit 32, namely the temperature of the refrigerant gas flowing through the conduit 32, rises higher than 3° C., the temperature switch 30 turns off and the relay 35 opens the make contact 35a so that the solenoid valve 12 is not energized. The compressor 1 is operated at its maximum (100%) displacement. On the other hand, when the temperature of the conduit 32 comes down below −1° C., the switch 30 turns on, and the relay 35 closes the make contact 35 so that compressor 1 is operated at 30-50% of the maximum displacement capacity.

In the described embodiments of the invention, the refrigeration temperature and the pressure in the conduit between the pressure check valve and the compressor are detected for the displacement control of the compressor. However, the temperature detector or sensor may alternatively be disposed to detect the temperature of the refrigerant in the evaporator, the temperature of the evaporator fins or other refrigerant conduits or the air temperature just downstream of the evaporator. The temperature sensor may be replaced by a pressure senser for detecting the refrigerant pressure within the evaporator.

The compressor 1 used in the described embodiments is not limited to the vane type described and may alternatively be of another type.

It will be appreciated from foregoing description that the refrigeration system according to the present invention provides a senser for cooling load and a multi-stage compressor displacement control so that the compressor displacement can be automatically varied stepwise to match with variable demand or cooling load to advantageously provide pleasant air-conditioning, minimize the power and the noise required for the compressor operation and keep the air temperature relatively constant to give users a good feeling.

What is claimed is:

1. An automotive refrigeration system comprising:
    variable capacity refrigerant compressor means for pressurizing a quantity of refrigerant, said compressor means including means for varying the displacement of said compressor means;
    refrigerant evaporation means for evaporating said refrigerant;
    conduit means for connecting said evaporator means with said compressor means;
    means for recirculating the refrigerant from the compressor means back to the evaporator means;
    valve means disposed in said conduit means for changing the effective diameter of said conduit means in response to the pressure of said refrigerant;
    sensing means coupled to said conduit means between said valve means and said compressor means for detecting the temperature of the refrigerant in said conduit means between said valve means and said compressor means; and
    control means connected to said displacement varying means for controlling the displacement of said compressor in response to said detected refrigerant temperature.

2. A system as in claim 1 wherein said sensing means is disposed on an exterior surface of said conduit means.

3. An automotive refrigeration system as claimed in claim 1, wherein said control means is arranged to cooperate with said compressor displacement varying means in accordance with a signal produced by said sensing means to provide two stages of displacement of such compressor means, a first stage being from 30 to 50% of a maximum compressor displacement and second stage being 100% of the maximum compressor displacement.

4. An automotive refrigeration system as claimed in claim 1, wherein said compressor means is of a vane type and said compressor displacement varying means comprises at least one unloading port formed in said compressor means and being adapted to release the refrigerant being compressed therein and a valve member operatively associated with said unloading port.

5. An automotive refrigeration system as claimed in claim 4, wherein said control means includes a pressure responsive actuator operatively connected to said valve member and a solenoid valve means for controlling the application of a pressure to said pressure responsive actuator.

6. An automotive refrigeration system as claimed in claim 5, wherein said compressor means includes an intake chamber and a discharge chamber and wherein said solenoid valve means is provided with a first port pneumatically connected to said pressure responsive actuator and second and third ports pneumatically connected to said compressor intake and discharge chambers, respectively, and a solenoid-operated valve member movable to selectively communicate said first port with said second and third ports.

7. An automotive refrigeration system as claim in claim 4, wherein said compressor displacement varying means comprises a single unloading port and a valve member operatively associated therewith and wherein said compressor means and said unloading port are arranged such that, when said unloading port is opened by said valve member, the displacement of the compresser means is reduced to a level substantially equal to from 30 to 50% of the maximum displacement of said compressor means.

8. An automotive refrigeration system as claimed in claim 1, further including means for causing air to flow in heat exchange relationship to the refrigerant in said evaporator means.

9. An automotive refrigeration system as claimed in claim 8, further including air temperature sensing means for detecting the ambient air temperature.

10. An automotive refrigeration system as in claim 1, further comprising:
clamp means disposed on said conduit means for securing said sensing means to said conduit means; and
thermal insulating means, disposed on said conduit means and covering said sensing means, for thermally insulating said sensing means and said conduit means for the surrounding environment.

11. An automotive refrigeration system comprising:
variable capacity refrigerant compressor means for pressurizing a quantity of refrigerant, said compressor means including means for varying the displacement of said compressor means;
refrigerant evaporation means for evaporating said refrigerant;
conduit means for connecting said evaporator means with said compressor means;
means for recirculating the refrigerant from the compressor means back to the evaporator means;
valve means disposed in said conduit means for changing the effective diameter of said conduit means in response to the pressure of said refrigerant;
sensing means coupled to said conduit means between said valve means and said compressor means for detecting a characteristic of the refrigerant in said conduit means between said valve means and said compressor means; and
control means connected to said displacement varying means for controlling the displacement of said compressor in response to said detected refrigerant characteristic.

* * * * *